United States Patent
Goto

(10) Patent No.: US 6,744,002 B1
(45) Date of Patent: Jun. 1, 2004

(54) METHOD AND APPARATUS FOR ELECTRODISCHARGE WIRE MACHINING

(75) Inventor: Akihiro Goto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 6 days.

(21) Appl. No.: 10/181,210

(22) PCT Filed: Nov. 20, 2000

(86) PCT No.: PCT/JP00/08138

§ 371 (c)(1),
(2), (4) Date: Jul. 15, 2002

(87) PCT Pub. No.: WO02/40208

PCT Pub. Date: May 23, 2002

(51) Int. Cl.[7] ................................................. B23H 7/02
(52) U.S. Cl. ................................................. 219/69.12
(58) Field of Search ........................... 219/69.12, 69.17

(56) References Cited

U.S. PATENT DOCUMENTS 5,083,000 A * 1/1992 Sakue

FOREIGN PATENT DOCUMENTS

| JP | 47-3078 | | 1/1972 |
| JP | 1-97524 | | 4/1989 |
| JP | 1-216724 | A * | 8/1989 |
| JP | 5-77109 | A * | 3/1993 |
| JP | 9-239622 | | 9/1997 |

OTHER PUBLICATIONS

Improvement of Accuracy of Second–Cut using Dry WEDM; Written by Adachi, Furutachi and Kunieda, Shaping technology, vol. 14, No. 7 (1999) p. 154–155.

Journal of the Japan Society for Precision Engineering, written by Kunieda and Yoshida, vol. 64, No. 12 (1998) p. 1735–1738.

Micro–Machining by EDM in Gas; Written by Yoshida and Kunieda, Japan society of Electrical–Machining Engineers National convention collected papers, (1996) p. 77–80.

Masanori Kunieda, "Houden Kakou ni Break Through wo motarasu Gijutsu Doukou." Kikai Gijutsu, vol. 48, No. 5, May 2000 (Tokyo) pp. 18–22.

* cited by examiner

Primary Examiner—Geoffrey S. Evans
(74) Attorney, Agent, or Firm—Sughrue Mion, PLLC

(57) ABSTRACT

In wire electric discharge machining in which electric discharge energy is supplied between a wire electrode (1a) and a workpiece (2) by a machining electric power supply means (16) so as to machine the workpiece (2) when the wire electrode (1a) and the workpiece (2) are relatively traveled with each other by a positioning means, there are provided a first process in which rough machining is conducted in a working solution (4a) and a second process in which finish-machining is conducted in gas (7) such as air, oxygen, nitrogen or inert gas, and the positioning means is controlled by a control means (17) so that a relative traveling speed of the wire electrode (1a) with the workpiece (2) in the second process can be set at a constant rate not lower than a predetermined rate at which a short circuit can not continue between the electrodes for a predetermined period of time and more which has been previously set according to a required specification. It is possible to realize a high accuracy and quality of wire electric discharge machining and also it is possible to realize an enhancement of productivity.

10 Claims, 4 Drawing Sheets

METHOD AND APPARATUS FOR ELECTRODISCHARGE WIRE MACHINING

CROSS REFERENCE TO RELATED APPLICATIONS

This application is a 371 of PCT/JP00/08138, filed Nov. 20, 2000.

TECHNICAL FIELD

The present invention relates to improvements in a wire electric discharge machining method and a wire electric discharge machine in which an electric discharge is induced in a gap formed between a wire electrode and a workpiece so that the workpiece can be machined.

BACKGROUND ART

Electric discharge machining has acquired a steadfast position as a technique for machining metallic dies and others. Therefore, electric discharge machining has been widely used for machining metallic dies in the automobile industry, electric appliance industry and semiconductor industry.

FIGS. 4A to 4E are schematic illustrations for explaining a mechanism of electric discharge machining. In the drawing, reference numeral 1 is an electrode, reference numeral 2 is a workpiece, reference numeral 3 is an arc column, reference numeral 4 is a machining solution and reference numeral 5 represents chips produced in the process of electric discharge machining. While the following processes (a) to (e), which correspond to FIGS. 4A to 4E, are being repeatedly conducted, removal machining is conducted on the workpiece 2 by electric discharges. Each process proceeds as follows.

(a) Formation of the arc column 3 by the generation of electric discharges (b) Local melt of the workpiece and vaporization of the machining solution 4 by the thermal energy of electric discharges (c) Generation of vaporizing explosive power by the machining solution 4

(d) Dispersion of the melted portion (chips 5)

(e) Cooling, coagulation and restoration of insulation between the electrodes executed by the machining solution The present invention relates to wire electric discharge machining used for gouging, cutting and so forth. Concerning the technique of wire electric discharge machining, there is a strong demand for higher accuracy. For example, when metallic dies used in the field of manufacturing semiconductors, the dimensional accuracy of which is high, are machined, it is necessary to conduct machining with high accuracy of 1 to $2 \mu m$.

FIGS. 5A to 5C are schematic illustrations showing an example of the wire electric discharge machining process. In the drawing, reference numeral 1a is a wire electrode, reference numeral 2 is a workpiece, reference numeral 4a is water which is a machining solution, and reference numeral 6 is an initial hole. FIG. 5A shows a first cut process which is a rough machining process, FIG. 5B shows a second cut process which is an intermediate finishing process to be conducted after the rough machining process, and FIG. 5C shows a third cut process which is a final finishing process.

An example of the first cut process shown in FIG. 5A shows a gouging process in which the wire electrode 1a is threaded into the initial hole 6 and the workpiece 2 is gouged by electric discharges. In the case of the first cut process described above, since the surface roughness and the accuracy are finished in the later process, it is unnecessary to machine the workpiece with smooth surface roughness high accuracy, and it is important to increase a rate of machining so as to enhance the productivity. In order to enhance the rate of wire electric discharge machining, water 4a is strongly jetted out between the electrodes so that chips can be effectively ejected from between the electrodes. In order to spray water 4a between the electrodes uniformly and prevent the breaking of the wire electrode 1a, a method is adopted in which water 4a is stored up in a machining tank not shown and the workpiece 2 is dipped in the water 4a.

In the conventional wire electric discharge machining method described above, the second cut process (shown in FIG. 5B), which is executed after the first cut process (shown in FIG. 5A), and the third cut process (shown in FIG. 5C), are executed in the water 4a which is a machining solution.

When a voltage is impressed between the wire electrode 1a and the workpiece 2, an electrostatic force is generated between the positive and the negative polarity. By this electrostatic force, the wire electrode 1a, the rigidity of which is low, is drawn onto the workpiece 2 side, which could be a cause of vibration of the wire electrode 1a. Due to the vibration, it becomes difficult to conduct electric discharge machining with high accuracy.

When vaporizing explosive power is generated in the machining solution by electric discharge energy (for example, as shown in FIG. 4C), the wire electrode 1a is given a strong force by the vaporizing explosive power created in the machining solution in a direction opposite to the workpiece 2, and vibration is generated. Due to the vibration, irregularities are caused on the profile of the workpiece 2, which impairs the dimensional accuracy.

In the industry of semiconductors in which wire electric discharge machining is utilized, the following uses are increased. For example, in the case of machining metallic dies of IC lead frames, very high accuracy and very smooth surface roughness are required when a workpiece is machined, the dimensional accuracy of which is not more than $1 \mu m$, and the surface roughness of which is not more than $1 \mu m$ Rmax, and further it becomes necessary to enhance the productivity. Especially, in the case where high accuracy and smooth surface roughness are required as described above, remarkable problems are caused by the aforementioned vibration of the wire electrode.

As a means for solving the above problems caused in wire electric discharge machining conducted in the machining solution, there is disclosed a technique of wire electric discharge machining conducted in the atmosphere while a machining solution is not being interposed between the electrodes. This technique is disclosed by the title of "Enhancement of Accuracy of Second Cut by Electric Discharge Machining Conducted in Atmosphere" written by Adachi et al. of Tokyo University of Agriculture and Technology on page 154 of the seventh issue of the fourteenth volume of "Die Technology" published by Nikkan Kogyo Shinbunsha in 1999. According to this technique, it is disclosed that the straightness of a cut section of a workpiece can be enhanced by wire electric discharge machining conducted in the atmosphere. From the viewpoint of enhancing the accuracy, this technique has a great significance. However, it is difficult to put this technique into practical use because a short circuit tends to occur between the wire electrode and the workpiece compared with the electric discharge machining conducted in a machining solution and the machining can not be stabilized and the rate of machining can not be increased.

DISCLOSURE OF THE INVENTION

It is an object of the present invention to provide a wire electric discharge machining method and a wire electric discharge machine capable of realizing the high accuracy and quality of wire electric discharge machining and also capable of realizing the enhancement of productivity of wire electric discharge machining.

The present invention provides a wire electric discharge machining method in which electric discharge is generated between the electrodes of a wire electrode and a workpiece so as to machine the workpiece by the electric discharge, comprising the steps of: a first step of conducting rough machining in a machining solution; and a second step of conducting finish machining in gas, wherein a relative traveling speed of the wire electrode with the workpiece in the second step is set at a constant speed not lower than a predetermined speed at which a short circuit between the electrodes can not continue for a predetermined period of time and more which has been previously set according to a required specification.

The present invention also provides a wire electric discharge machining method in which electric discharge is generated between the electrodes of a wire electrode and a workpiece so as to machine the workpiece by the electric discharge, comprising the steps of: a first step of conducting rough machining in a machining solution; and a second step of conducting finish machining in gas, wherein a relative traveling speed of the wire electrode with the workpiece in the second step is set at a variable speed not lower than a predetermined speed at which a short circuit between the electrodes can not continue for a predetermined period of time and more which has been previously set according to a required specification.

The present invention also provides a wire electric discharge machining method, in which the variable relative traveling speed is controlled so that it can be increased in the case where the number of normal electric discharge pulses per unit time is large, and the variable relative traveling speed is controlled so that it can be decreased in the case where the number of normal electric discharge pulses per unit time is small.

The present invention also provides a wire electric discharge machining method, in which the predetermined traveling speed at which the short circuit can not continue for a predetermined period of time and more which has been previously set according to the required specification is compared with the predetermined traveling speed at which a frequency of concentrated generation of electric discharge is lower than a frequency which has been previously set according to the required specification, and the relative traveling speed is controlled so that it can be a speed not lower than the faster speed of the two traveling speeds.

The present invention provides a wire electric discharge machine in which electric discharge energy is supplied between a wire electrode and a workpiece by a machining electric power supply means so as to machine the workpiece in gas when the wire electrode and the workpiece are relatively traveled with each other by a positioning means, comprising a control means for controlling the positioning means so that a relative traveling speed of the wire electrode with the workpiece can be set at a constant speed not lower than a predetermined speed at which a short circuit between the electrodes can not continue for a predetermined period of time or more which has been previously set according to a required specification.

The present invention also provides a wire electric discharge machine in which electric discharge energy is supplied between a wire electrode and a workpiece by a machining electric power supply means so as to machine the workpiece in gas when the wire electrode and the workpiece are relatively traveled with each other by a positioning means, comprising a control means for controlling the positioning means so that a relative traveling speed of the wire electrode with the workpiece can be set at a variable speed not lower than a predetermined speed at which a short circuit between the electrodes can not continue for a predetermined period of time and more which has been previously set according to a required specification.

The present invention also provides a wire electric discharge machine, further comprising a control means for controlling the variable relative traveling speed so that it can be increased in the case where the number of normal electric discharge pulses per unit time is large and also for controlling the variable relative traveling speed so that it can be decreased in the case where the number of normal electric discharge pulses per unit time is small.

The present invention also provides a wire electric discharge machine, further comprising a control means for controlling the positioning means in such a manner that the relative traveling speed is controlled so that it can be a speed not lower than the faster speed of the two traveling speeds when the predetermined traveling speed at which the short circuit can not continue for a predetermined period of time and more which has been previously set according to the required specification is compared with the predetermined traveling speed at which a frequency of concentrated generation of electric discharge is lower than a frequency which has been previously set according to the required specification.

Since the wire electric discharge machining method and the electric discharge machine of the present invention are composed as described above, it is possible to enhance the stability of wire electric discharge machining conducted in gas and further it is possible to increase the rate of machining. Therefore, the accuracy, quality and productivity of wire electric discharge machining can be enhanced.

THE MOST MODES FOR CARRYING OUT THE INVENTION

Figure 1A:
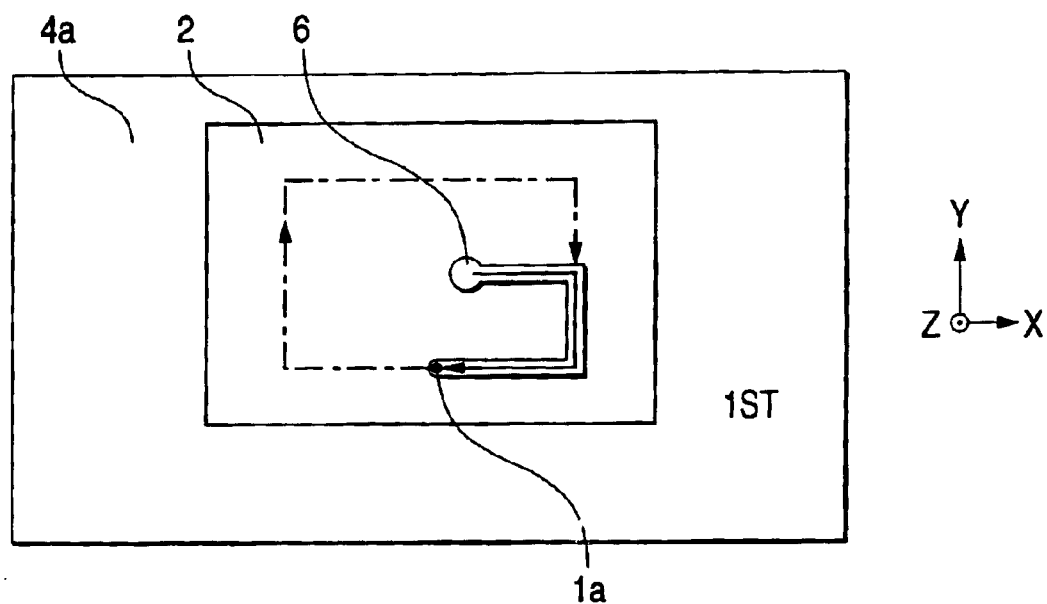
FIGS. 1A and 1B are schematic illustrations showing an example of a wire electric discharge machining method of an embodiment of the present invention.
Figure 1B:
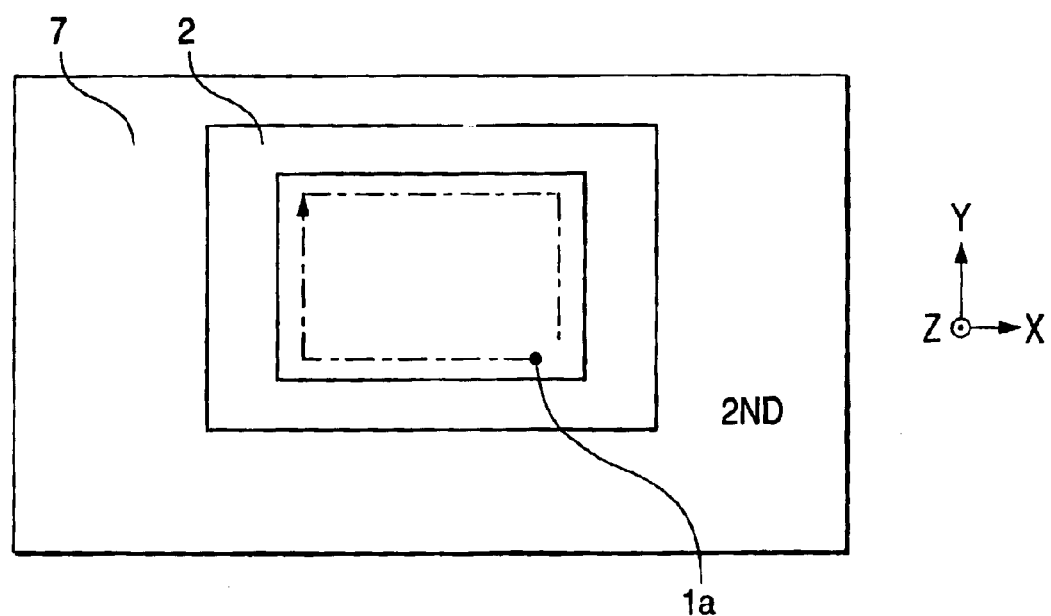

FIGS. 1A and 1B are schematic illustrations showing an example of a wire electric discharge machining method of an embodiment of the present invention. In the drawing, reference numeral 1a is a wire electrode, reference numeral 2 is a workpiece, reference numeral 4a is water which is a machining solution, reference numeral 6 is an initial hole, and reference numeral 7 is gas such as air. FIG. 1A in a view showing a first cut process in which rough machining is conducted, and FIG. 1B is a view showing a second cut process in which finish machining is conducted after rough machining. In this case, names of the first and the second cut process are expediently determined. Therefore, wire electric discharge machining is not necessarily completed by the two times. In the case where electric discharge machining is conducted with high accuracy because the required accuracy is high, the cutting processes are conducted by seven or eight times.

Figure 5A:
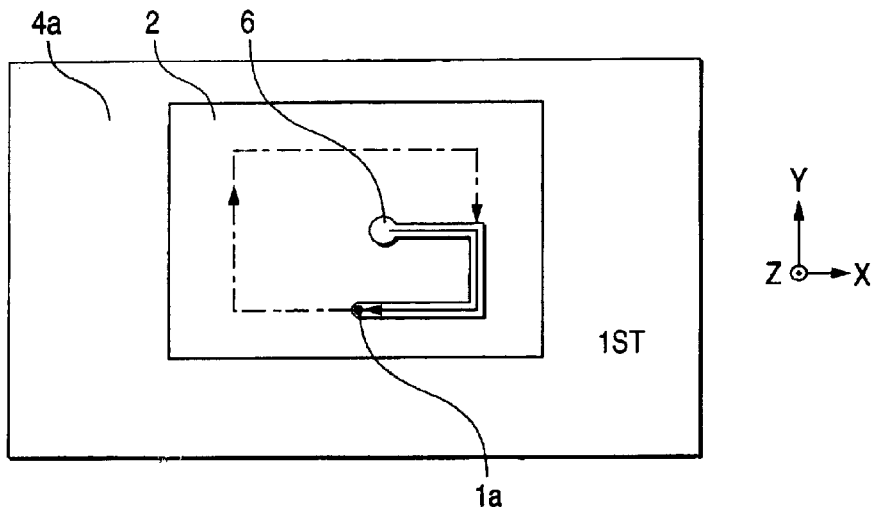
FIGS. 5A to 5C are schematic illustrations showing an example of a machining process of wire electric discharge machining.
Figure 5B:
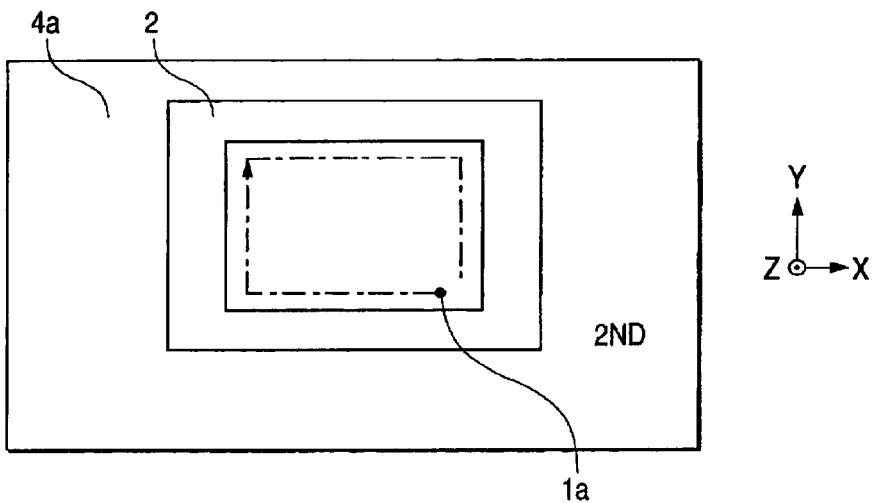
Figure 5C:
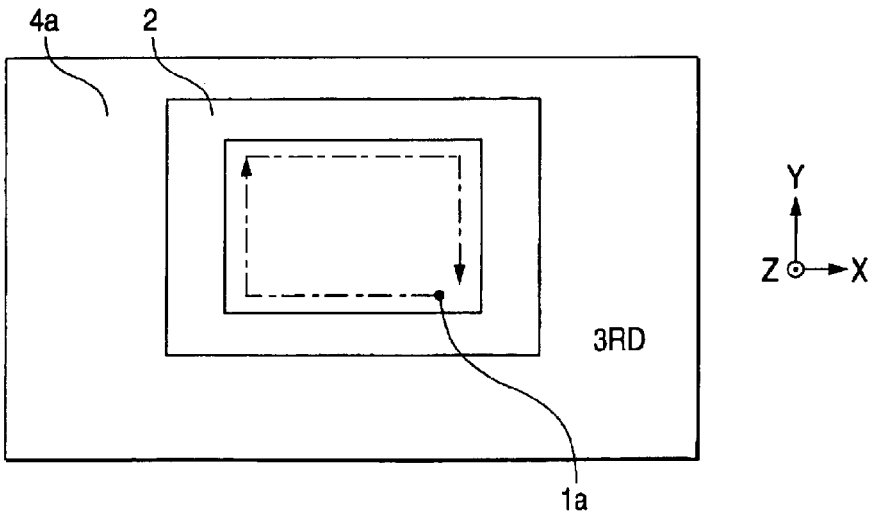

Next, an outline of the machining method will be explained below. In the first cut process shown in FIG. 1A, the wire electrode 1a is threaded into the initial hole 6, and the workpiece 2 is gouged. In the first cut process, it is not required to conduct machining with such severe surface roughness and high dimensional accuracy because finish machining is conducted in the later process with severe surface roughness and high dimensional accuracy. Therefore, in the first cut process, it is important to increase a rate of machining so that the productivity can be enhanced. In the same manner as that of the background art shown in FIGS. 5A to 5C, electric discharge machining is conducted while water 4a, which is a machining solution, is being interposed between the electrodes.

In the usual wire electric discharge machining, machining is continued in a machining solution even after the first cut. However, as described in the background art, problems such as vibration of the wire electrode are caused in this case. Therefore, the usual wire electric discharge machining is not appropriate for machining with high accuracy. The present invention is characterized in that dimensional accuracy and surface roughness of a workpiece are improved by conducting electric discharge machining while a machining solution is not being interposed between the electrodes in the finishing process.

In the second cut process shown in FIG. 1B which is a finishing process, in order to improve the accuracy of a profile to be machined by suppressing the occurrence of vibration of the wire electrode 1a, electric discharge machining is conducted not in the machining solution 4a but in the gas 7. When wire electric discharge machining is conducted in the gas in this way, it is possible to suppress the occurrence of vibration of the wire electrode 1a as the following description.

An intensity of the electrostatic force, which acts on the wire electrode 1a and the workpiece 2 when voltage is impressed between the electrodes, is proportional to the dielectric constant between the electrodes. Therefore, when the distance between the electrodes is the same, the intensity of the electrostatic force in the case where the mist 7 is interposed between the electrodes is one several tenths of that in the case where the water 4a is interposed between the electrodes. (For example, the dielectric constant is the lowest in vacuum, and the dielectric constant in water is approximately 80 times as high as that in vacuum.) Since the vaporizing explosive power caused by electric discharge is generated by liquid existing between the electrodes, when only the mist 7 exists between the electrodes, the wire electrodes 1a is seldom affected by the vaporizing explosive power. Accordingly, it is possible to suppress the occurrence of vibration of the wire electrode 1a.

Figure 2:
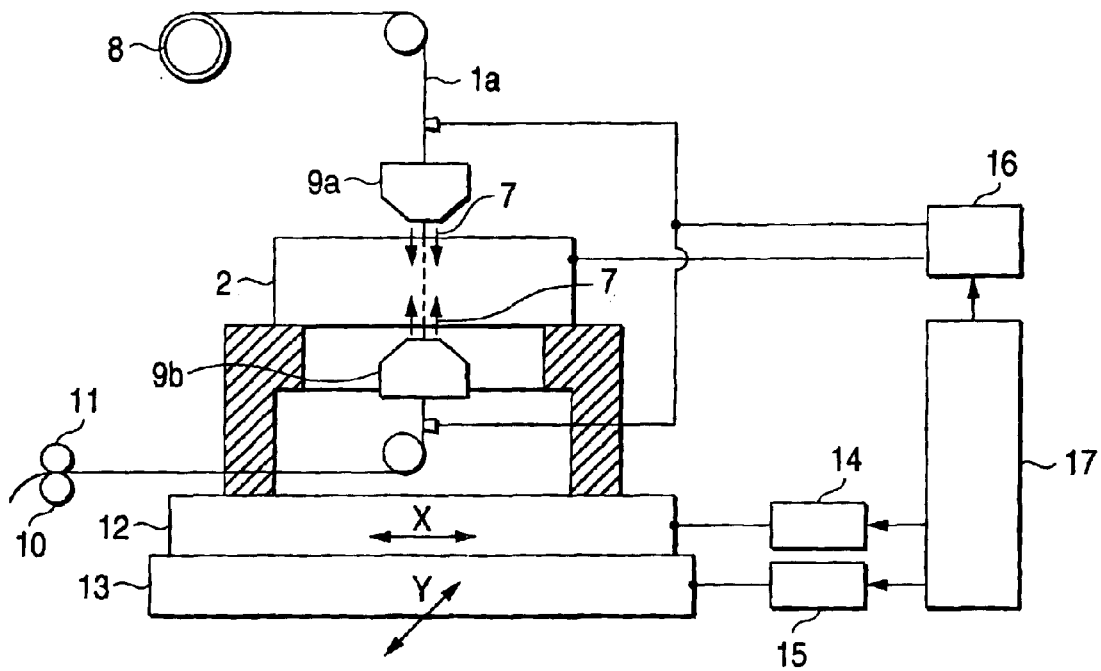
FIG. 2 is an arrangement view showing a wire electric discharge machine of an embodiment of the present invention.

FIG. 2 is an arrangement view showing a wire electric discharge machine of an embodiment of the present invention. That is, FIG. 2 is an arrangement view showing an example of arrangement in which wire electric discharge machining conducted in gas can be realized as shown in FIG. 1B. In FIG. 2, reference numeral 1a is a wire electrode, reference numeral 2 is a workpiece, reference numeral 7 is gas such as air, oxygen, nitrogen or inert gas, reference numeral 8 is a wire bobbin, reference numerals 9a, 9b are a gas supply means for supplying gas 7 between the wire electrode 1a and the workpiece 2, reference numeral 10 is a capstan roller, reference numeral 11 is a pinch roller, reference numeral 12 is an X table for driving the workpiece 2 in the horizontal direction (X-direction), reference numeral 13 is a Y table for driving the workpiece 2 in the horizontal direction (Y-direction), reference numeral 14 is an X-axis servo amplifier for controlling a drive motor not shown for driving the X-table 12, reference numeral 15 is a Y-axis servo amplifier for controlling a drive motor not shown for driving the Y-table 13, reference numeral 16 is a machining power supply means, and reference numeral 17 is a control means.

Next, operation will be explained below. While the wire electrode 1a is being held and drawn by the capstan roller 10 and the pinch roller 11, the wire electrode 1a is made to run. While the wire electrode 1a and the workpiece 2 are being opposed to each other, gas 7 is supplied between electrodes of the wire electrode 1a and the workpiece 2 by the gas supply means 9a, 9b. During this process, machining electric power, which is electric discharge energy, is supplied between the electrodes by the machining electric power supply means 16. While the wire electrode 1a and the workpiece 2 are being relatively moved by the X-table 12 and the Y-table 13 which are the positioning means, the workpiece 2 is subjected to finish-machining by electric discharge. Relative positioning control for positioning the wire electrode 1a and the workpiece 2 by the positioning means is governed by the control means 17, and also control for controlling an electric machining condition is governed by the control means 17. The gas supply means 9a, 9b can be realized, for example, when nozzles are provided around the wire electrode 1a so as to supply pressurized gas. When pressurized gas is supplied between the electrodes as described above, it is possible to prevent chips, which are produced by electric discharge machining, from adhering to the wire electrode and the surface of the workpiece. It is possible to conduct wire electric discharge, which is to be conducted in gas, in the atmosphere without using the gas supply means 9a, 9b described above.

As explained referring to FIG. 1B, it is possible to suppress the occurrence of vibration of the wire electrode in wire electric discharge machining conducted in gas. Therefore, the profile accuracy and surface roughness of the workpiece can be enhanced, however, the method of wire electric discharge machining conducted in gas has problems peculiar to the electric discharge conducted in gas. The biggest problem is that a distance between the electrodes is short. When usual wire electric discharge machining is conducted in a machining solution, the distance between the electrodes in the case of electric discharge is extended by the influence of chips interposed between the electrodes. However, in the case of wire electric discharge machining conducted in gas, chips are seldom interposed between the electrodes. Therefore, the distance between the electrodes is reduced. When the distance between the electrodes is reduced, the machining accuracy can be advantageously enhanced. On the other hand, as described in the background art, when the distance between the electrodes is reduced, a problem is caused in which the wire electrode and the workpiece are short-circuited to each other in the process of electric discharge machining, which could be a cause of the generation of stripes on the machining surface of the workpiece and further which could be a cause of deterioration of the rate of machining.

When a short circuit is once caused in the process of wire electric discharge machining conducted in gas, the electric discharge repeatedly goes forward and backward at the same place, and the problem of a short circuit can not be easily solved and stripes are formed on the machining surface in many cases.

Although causes of this phenomenon have not been found yet, it is estimated that the following items (1) to (3) are the causes.

(1) Although a portion in which a short circuit has occurred is not machined by electric discharge, a portion which has been machined immediately before the occurrence of the short circuit is relatively hollowed, and the portion in which the short circuit has occurred is protruded. In this way, irregularities are formed on the surface to be machined by electric discharge. When the short circuit has occurred, the electrode goes backward. However, in the case where a servo control between the electrodes, in which a distance between the wire electrode and the workpiece is controlled by an average voltage between the electrodes, is conducted, since the portion immediately before the short-circuited portion has already been machined by electric discharge, the average voltage between the electrodes is raised, so that the relative traveling speed is increased. When the electric discharge arrives at the short-circuited portion under the above condition, it is impossible for the relative traveling speed to be suddenly reduced. Therefore, a short circuit occurs again. When the above phenomenon is repeated, the short circuit is repeated at the same place.

(2) When the short circuit occurs, the wire electrode is deposited with the workpiece in some cases. When this deposited portion is separated from the workpiece, the wire electrode is vibrated in a direction perpendicular to the advancing direction of the wire electrode, that is, the wire electrode is vibrated in a direction of the face of the workpiece to be machined, and this vibration can not be easily dumped. Therefore, a state of the short circuit between the irregularities on the machining face of the workpiece and the wire electrode continues.

(3) Depending upon a combination of the material of the workpiece with the wire electrode, the workpiece is magnetized by electric discharge machining, and an attraction force is generated between the workpiece and the wire electrode. Therefore, it is impossible to solve the problem of the short circuit.

It is possible to estimate the above causes. In any cases, it is a problem that the wire electrode stays at the same position for a predetermined period of time and more.

Therefore, according to the wire electric discharge machining method of the present invention, in the wire electric discharge machining conducted in gas, while the wire electrode and the workpiece are relatively being traveled from each other at a predetermined traveling rate at which a short circuit does not continue for a predetermined period of time and more which has been previously set according to a required specification such as a required accuracy of the machining face, electric discharge machining is conducted. In this connection, servo control between the electrodes is not conducted in this case, but the wire electrode and the workpiece are always relatively traveled from each other at a rate not less than the predetermined rate.

The predetermined rate is determined by the machining conditions such as material and thickness of the workpiece, material and diameter of the wire electrode and an electric condition of electric discharge. The larger the wall thickness of the workpiece is, the higher the predetermined rate must be increased. The smaller the diameter of the wire electrode is, the higher the predetermined rate must be increased. The lower the intensity of electric discharge energy determined by the electric condition is, the higher the predetermined rate must be increased. Therefore, the predetermined rate may be previously determined by experiments according to the material and thickness of the workpiece, material and diameter of the wire electrode and electric condition of electric discharge machining.

Electric discharge machining may be conducted at a constant rate while the relative traveling rate of the wire electrode with the workpiece is being kept at a value not less than the predetermined rate. Alternatively, electric discharge machining may be conducted at a variable rate while the relative traveling rate of the wire electrode with the workpiece is being kept at a value not less than the predetermined rate. In the case where the relative traveling rate is made to be a variable value not less than the predetermined rate, for example, when the number of normal electric discharge pulses per unit time is large, the rate is increased, and when the number of normal electric discharge pulses per unit time is small, the rate is decreased, and control may be conducted by the control means 17 shown in FIG. 2 so that the relative traveling rate, which is not less than the predetermined rate, can be maintained.

When the wall thickness of the workpiece is especially large, electric discharge tends to concentrate on an upper end portion and a lower end portion of the workpiece. The main reason why is described in the following items (1) to (3).

(1) Since electric discharge tends to occur at the upper and the lower end portion of the workpiece, electric discharge tends to concentrate on the upper and the lower end portion of the workpiece.

(2) In the case of electric discharge conducted in gas, when electric discharge concentrates on the same position, a phenomenon is caused in which the wire electrode material adheres to the workpiece. This adhesion of the wire electrode material to the workpiece facilitates the concentration of electric discharge.

(3) In the case where the wall thickness of the workpiece is large, the relative traveling rate of the wire electrode with the workpiece is set low in many cases. Therefore, the concentration of electric discharge is facilitated.

Figure 3:
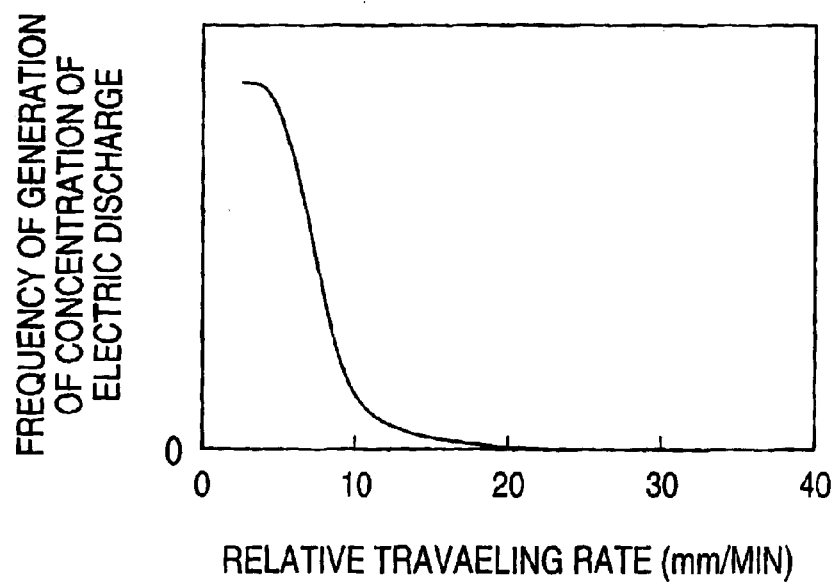
FIG. 3 is a graph showing a relation between a relative traveling speed of a wire electrode with a workpiece and a frequency of concentrated generation of electric discharge.
Figure 4A:
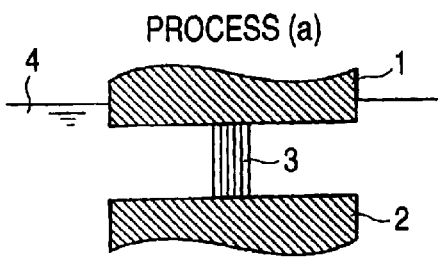
FIGS. 4A to 4E are schematic illustrations showing a mechanism of electric discharge machining.
Figure 4B:
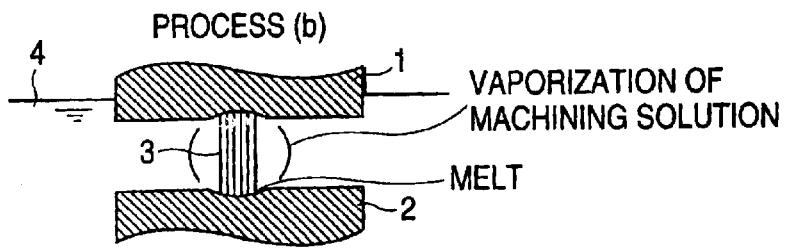
Figure 4C:
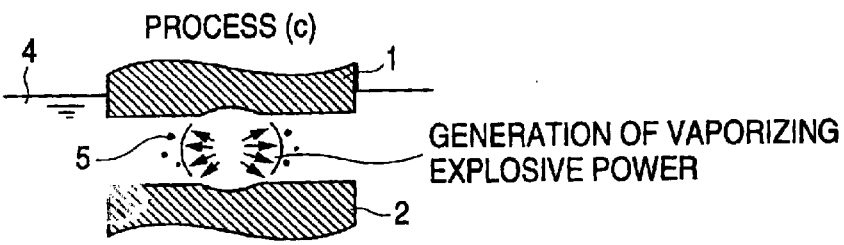
Figure 4D:
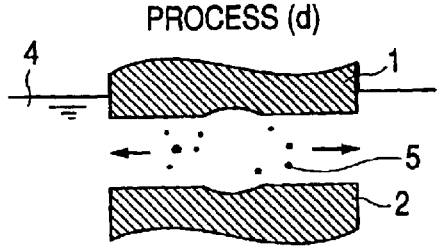
Figure 4E:
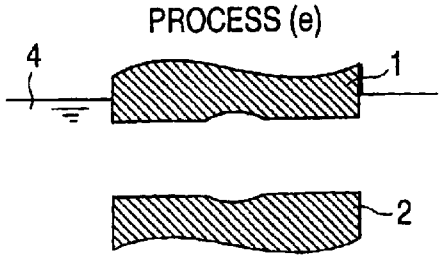

In order to suppress the concentration of electric discharge in the case where the wall thickness of the workpiece is large, an experiment was made in which the relative traveling rate of the wire electrode with the workpiece was changed. FIG. 3 is a graph showing a relation between the relative traveling traveling rate of the wire electrode with the workpiece and the frequency of generation of the concentration of electric discharge in the case where the workpiece is a steel plate having a well thickness of 100 mm. The following can be seen in the graph of FIG. 3. When the relative traveling rate of the wire electrode and the workpiece is increased, the frequency of generation of the concentration of electric discharge is suddenly lowered at a certain traveling rate. When the relative traveling rate of the wire electrode with the workpiece is further increased, the frequency of generation of the concentration of electric discharge becomes zero, that is, no concentration of electric discharge occurs.

In the case where the workpiece was a steel plate, the wall thickness of which was 100 mm, the relative traveling rate of the wire electrode with the workpiece was set at 1 mm/min which is usually used when finish-machining is executed in wire electric discharge machining conducted in a machining solution and finish-machining was executed in wire electric discharge machining conducted in gas. In this case, the concentration of electric discharge almost surely occurred at the upper and the lower end portion of the workpiece. However, when the relative traveling rate was increased to 10 mm/min, the concentration of electric discharge seldom occurred. Further, when the relative traveling rate was increased to 30 mm/min, no concentration of electric discharge occurred at all.

As described above, the predetermined rate at which the frequency of generation of the concentration of electric discharge becomes lower than the frequency which has been previously set according to the required specification is previously found by an experiment according to the machining condition, and this predetermined rate is compared with a predetermined rate at which the short circuit does not continue for a predetermined period of time and more which has been previously set according to the required specification, and the relative traveling rate of the wire electrode with the workpiece may be controlled by the control means 17 shown in FIG. 2 so that the relative traveling rate can be a value not less than the faster traveling rate.

As described above, in wire electric discharge machining conducted in gas, in the case where the relative traveling rate is not less than the predetermined rate, a quantity of removal by electric discharge machining is smaller than that in the case where the relative traveling rate is low. Therefore, it is necessary to increase the times of electric discharge machining. However, since the relative traveling rate is high, the overall machining time is not increased.

INDUSTRIAL CAPABILITY

As described above, the wire electric discharge machining method and device of the present invention are appropriately used for a highly accurate wire electric discharge machining work.

What is claimed is:

1. A wire electric discharge machining method in which electric discharge is generated between the electrodes of a wire electrode and a workpiece so as to machine the workpiece by the electric discharge, comprising the steps of:
   a relative traveling speed of the wire electrode with the workpiece in the second step is set at a constant speed not lower than a predetermined speed at which a short circuit between the electrodes can not continue for a predetermined period of time and more which has been previously set according to a required specification.

2. A wire electric discharge machining method according to claim 1, wherein the predetermined traveling speed at which the short circuit can not continue for a predetermined period of time and more which has been previously set according to the required specification is compared with the predetermined traveling speed at which a frequency of concentrated generation of electric discharge is lower than a frequency which has been previously set according to the required specification, and the relative traveling speed is controlled so that it can be a speed not lower than the faster speed of the two traveling speeds.

3. A wire electric discharge machining method in which electric discharge is generated between the electrodes of a wire electrode and a workpiece so as to machine the workpiece by the electric discharge, comprising the steps of:
   a first step of conducting rough machining in a machining solution; and
   a second step of conducting finish machining in gas, wherein
      a relative traveling speed of the wire electrode with the workpiece in the second step is set at a variable speed not lower than a predetermined speed at which a short circuit between the electrodes can not continue for a predetermined period of time and more which has been previously set according to a required specification.

4. A wire electric discharge machining method according to claim 3, wherein the predetermined traveling speed at which the short circuit can not continue for a predetermined period of time and more which has been previously set according to the required specification is compared with the predetermined traveling speed at which a frequency of concentrated generation of electric discharge is lower than a frequency which has been previously set according to the required specification, and the relative traveling speed is controlled so that it can be a speed not lower than the faster speed of the two traveling speeds.

5. A wire electric discharge machining method according to claim 3, wherein the variable traveling speed is controlled so that it can be increased in the case where the number of normal electric discharge pulses per unit time is large, and the variable traveling speed is controlled so that it can be decreased in the case where the number of normal electric discharge pulses per unit time is small.

6. A wire electric discharge machine in which electric discharge energy is supplied between electrodes of a wire electrode and a workpiece by a machining electric power supply means so as to machine the workpiece in gas when the wire electrode and the workpiece are relatively traveled with each other by a positioning means, comprising
   a control means for controlling the positioning means so that a relative traveling speed of the wire electrode with the workpiece can be set at a constant speed not lower than a predetermined speed at which a short circuit between the electrodes can not continue for a predetermined period of time and more which has been previously set according to a required specification.

7. A wire electric discharge machine according to claim 6, further comprising a control means for controlling the positioning means in such a manner that the relative traveling speed is controlled so that it can be a speed not lower than the faster speed of the two traveling speeds when the predetermined traveling speed at which the short circuit can not continue for a predetermined period of time and more which has been previously set according to the required specification is compared with the predetermined traveling speed at which a frequency of concentrated generation of electric discharge is lower than a frequency which has been previously set according to the required specification.

8. A wire electric discharge machine in which electric discharge energy is supplied between electrodes of a wire electrode and a workpiece by a machining electric power supply means so as to machine the workpiece in gas when the wire electrode and the workpiece are relatively traveled with each other by a positioning means, comprising
   a control means for controlling the positioning means so that a relative traveling speed of the wire electrode with the workpiece can be set at a variable speed not lower than a predetermined speed at which a short circuit between the electrodes can not continue for a predetermined period of time and more which has been previously set according to a required specification.

9. A wire electric discharge machine according to claim 8, further comprising a control means for controlling the positioning means in such a manner that the relative traveling speed is controlled so that it can be a speed not lower than the faster speed of the two traveling speeds when the predetermined traveling speed at which the short circuit can not continue for a predetermined period of time and more which has been previously set according to the required specification is compared with the predetermined traveling speed at which a frequency of concentrated generation of electric discharge is lower than a frequency which has been previously set according to the required specification.

10. A wire electric discharge machine according to claim 8, further comprising a control means for controlling the variable relative traveling speed so that it can be increased in the case where the number of normal electric discharge pulses per unit time is large and also for controlling the variable relative traveling speed so that it can be decreased in the case where the number of normal electric discharge pulses per unit time is small.

* * * * *